United States Patent
Zhang

(10) Patent No.: US 9,304,912 B1
(45) Date of Patent: Apr. 5, 2016

(54) SYSTEMS AND METHODS FOR BUILDING REDUNDANCY DATA IN A RAID SYSTEM

(71) Applicant: Marvell International, Ltd., Hamilton (BM)

(72) Inventor: Qi Zhang, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 307 days.

(21) Appl. No.: 13/721,916

(22) Filed: Dec. 20, 2012

Related U.S. Application Data

(60) Provisional application No. 61/584,157, filed on Jan. 6, 2012.

(51) Int. Cl.
*G11C 29/00* (2006.01)
*G06F 12/08* (2006.01)

(52) U.S. Cl.
CPC .................................... *G06F 12/08* (2013.01)

(58) Field of Classification Search
CPC ........................... G06F 3/0689; G06F 12/0246
USPC ............................................................ 711/165
See application file for complete search history.

(56) References Cited

U.S. PATENT DOCUMENTS

| | | | |
|---|---|---|---|
| 5,517,632 A * | 5/1996 | Matsumoto et al. | 711/114 |
| 8,209,587 B1 * | 6/2012 | Taylor et al. | 714/770 |
| 2006/0112222 A1 * | 5/2006 | Barrall | 711/114 |
| 2006/0224844 A1 * | 10/2006 | Kano et al. | 711/162 |
| 2008/0184000 A1 * | 7/2008 | Kawaguchi | 711/165 |
| 2010/0082900 A1 * | 4/2010 | Murayama et al. | 711/114 |
| 2013/0067188 A1 * | 3/2013 | Mehra et al. | 711/170 |

* cited by examiner

*Primary Examiner* — Adam M Queler
*Assistant Examiner* — Trang Ta

(57) ABSTRACT

System and methods are provided for building redundancy data of a source storage medium using a redundant-array-of-independent-disks (RAID) array, the RAID array including one or more target storage mediums, the source storage medium including multiple data areas. One or more invalid data areas on the source storage medium are identified. Identification information of the one or more invalid data areas is generated. Redundancy data for data areas on the source storage medium other than the one or more invalid data areas is built using the RAID array.

19 Claims, 5 Drawing Sheets

SYSTEMS AND METHODS FOR BUILDING REDUNDANCY DATA IN A RAID SYSTEM

CROSS-REFERENCE TO RELATED APPLICATIONS

This disclosure claims priority to and benefit from U.S. Provisional Patent Application No. 61/584,157, filed on Jan. 6, 2012, the entirety of which is incorporated herein by reference.

FIELD

The technology described in this patent document relates generally to data storage systems and more particularly to Redundant Array of independent Disks (RAID) data storage systems.

BACKGROUND

Redundant Array of Independent Disks (RAID) technology is often implemented for data storage. A RAID data storage system uses multiple physical hard drives as a single logical hard drive for data storage. Various RAID levels (e.g., RAID 1, RAID 4, RAID 5, RAID 10, etc.) and their associated data formats have been developed for different redundancy and performance requirements. Redundancy data, such as a copy of data (e.g., mirrored data) and/or parity information, may be generated under different RAID levels for hard-drive failure protection.

For example, under the RAID 1 level, data is written identically to two hard drives, thereby creating redundancy data in one of the hard drives. Under the RAID 10 level, data is written to a number of primary hard drives simultaneously on the same sector and then mirrored to a number of secondary disks as redundancy data. Further, under the RAID 4 level or the RAID 5 level, data is broken into segments (e.g., blocks) and then written to a number of hard drives simultaneously on the same sector of the hard drives. In addition, parity information is generated as redundancy data. Upon any hard drive failure, parity information may be used to recover/reconstruct lost data. The parity information is stored in a dedicated hard drive under the RAID 4 level, while the parity information is distributed across the hard drives under the RAID 5 level.

A RAID controller may be used to control a RAID array of one or more hard drives, handle communication between a RAID data storage system with external devices, and coordinate the array operation of the individual hard drives.

SUMMARY

In accordance with the teachings described herein, systems and methods are provided for building redundancy data of a source storage medium using a redundant-array-of-independent-disks (RAID) array, the RAID array including one or more target storage mediums, the source storage medium including multiple data areas. One or more invalid data areas on the source storage medium are identified, identification information of the one or more invalid data areas is generated. Redundancy data for data areas on the source storage medium other than the one or more invalid data areas is built using the RAID array.

In another embodiment, a system is provided for building redundancy data of a source storage medium using a redundant-array-of-independent-disks (RAID) array, the RAID array including one or more target storage mediums, the source storage medium including multiple data areas. The system includes a utility module configured to identify one or more invalid data areas on the source storage medium and generate identification information of the one or more invalid data areas, and a RAID controller configured to build redundancy data for data areas on the source storage medium other than the one or more invalid data areas using the RAID array.

In yet another embodiment, a system is provided for building redundancy data of a source storage medium using a redundant-array-of-independent-disks (RAID) array, the RAID array including one or more target storage mediums, the source storage medium including multiple data areas. The system includes one or more data processors, and a computer-readable memory encoded with programming instructions for commanding the one or more data processors to perform steps including, identifying one or more invalid data areas on the source storage medium, generating identification information of the one or more invalid data areas, and building redundancy data for data areas on the source storage medium other than the one or more invalid data areas using the RAID array.

DETAILED DESCRIPTION

Figure 1:
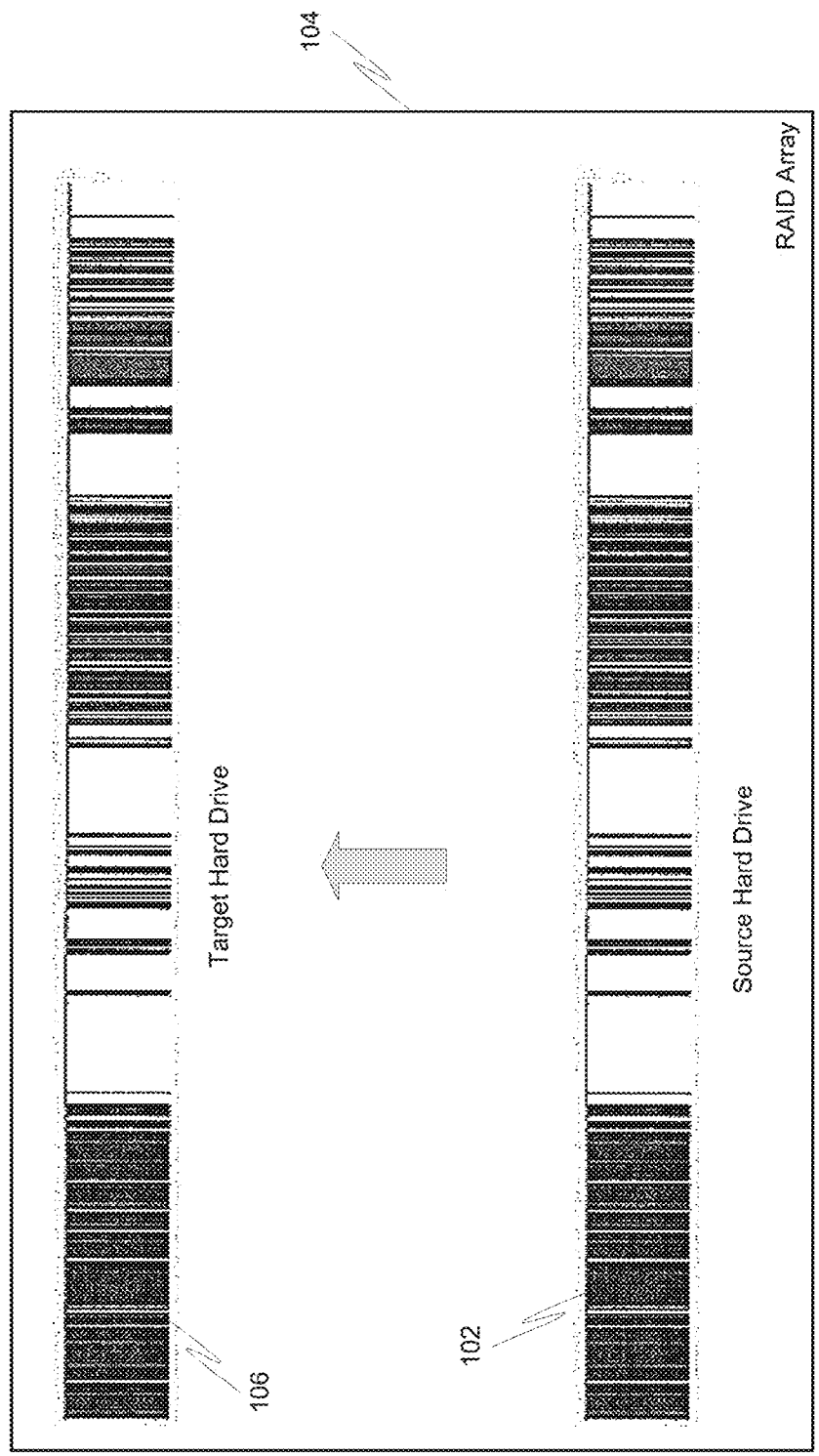
FIG. 1 illustrates an example of a conventional approach of building redundancy data.

Conventional approaches for building redundancy data in a RAID storage system often takes a long period of time. FIG. 1 illustrates an example of a conventional approach of building redundancy data. As shown in FIG. 1, data on a source hard drive 102 within a RAID array 104 is to be written to target hard drive 106 to build redundancy data, for example, under the RAID 1 level. The more data on the source hard drive 102, the longer it takes to build the redundancy data and the less efficient it becomes.

The conventional approach shown in FIG. 1 assumes that redundancy data needs to be built for all data areas (e.g., blocks) on the source hard drive 102. However, some data areas on the source hard drive 102 may be invalid, e.g., free data areas to be written on. Protection against hard drive failure for these invalid data areas is not necessary, and thus building redundancy data for these invalid data areas is not needed.

Figure 2:
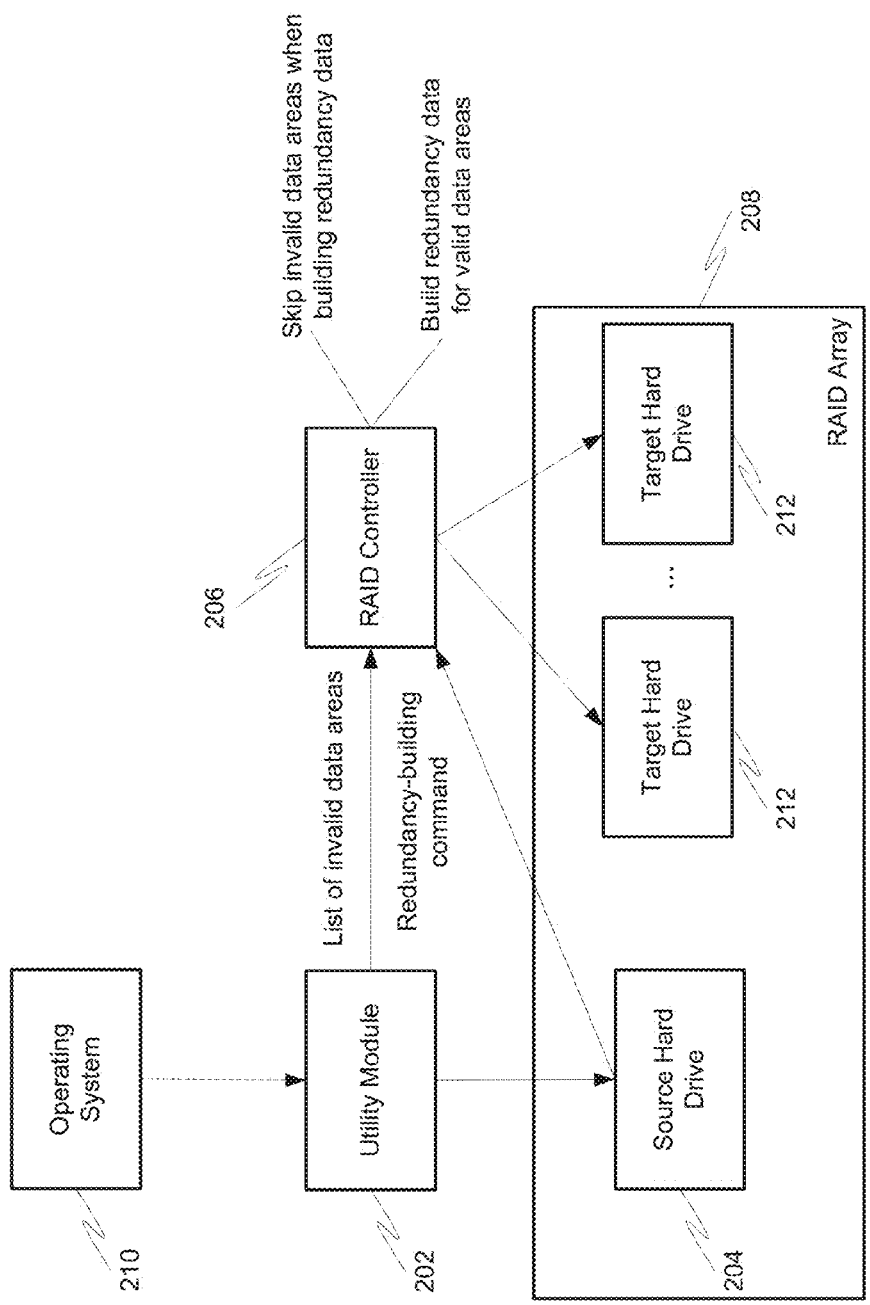
FIG. 2 illustrates an example of a RAID storage systems for building redundancy data.

FIG. 2 illustrates an example of a RAID storage system for building redundancy data. As shown in FIG. 2, a utility module 202 detects invalid data areas (e.g., free data areas) on a source hard drive 204. Information associated with such invalid data areas is provided to a RAID controller 206 which does not build redundancy data on a RAID array 208 for these invalid data areas.

Specifically, the utility module 202 may identify (e.g., through an operating system 210) the invalid data areas on the source hard drive 204 and obtain information (e.g., address, length) of the invalid data areas. Then, the utility module 202 sends the information of the invalid data areas (e.g., a list of the invalid areas) and a redundancy-building command to the RAID controller 206. The RAID controller 206 may skip the invalid data areas when building redundancy data on the RAID array 208 which includes one or more target hard drives 212. On the other hand, the RAID controller 206 may build redundancy data on the RAID array 208 for valid data areas of the source hard drive 204 (e.g., data areas other than the identified invalid data areas). For example, under the RAID 1 level, contents of the valid data areas are written identically to a target hard drive in the RAID array 208, while contents of the invalid data areas are not written to the target hard drive. In another example, under the RAID 4 level or the RAID 5 level, parity information is generated in the RAID array 208 for the valid data areas, but not for the invalid data areas. As an example, the source hard drive 204 may be included in the RAID array 208 as shown in FIG. 2, or external to the RAID array 208.

Figure 3:
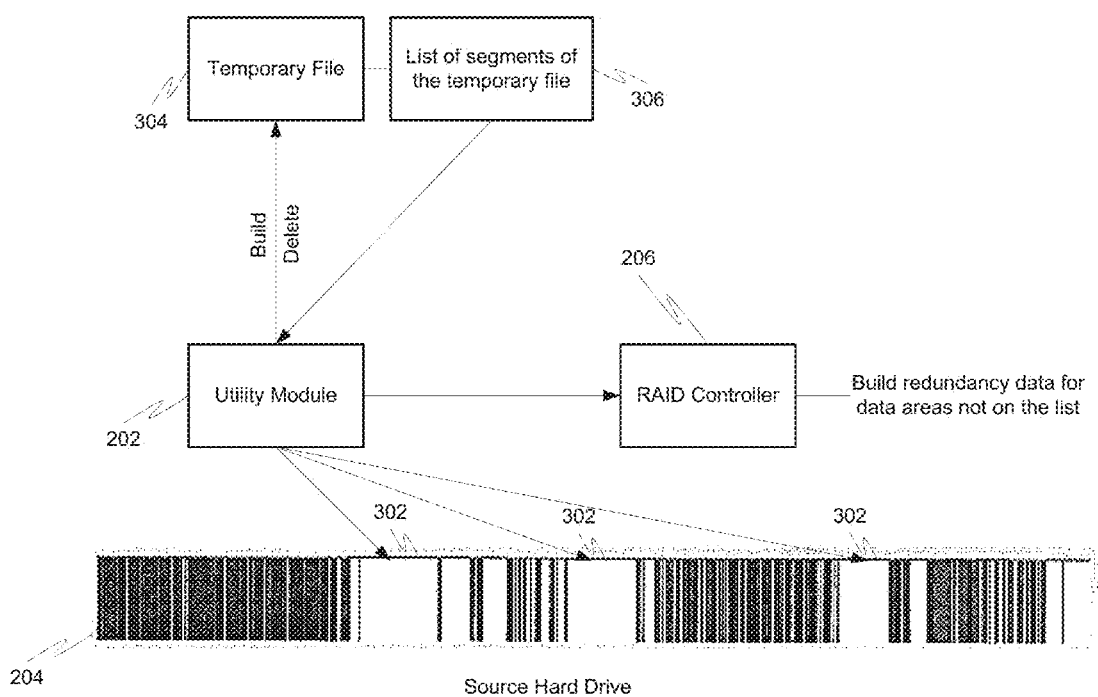
FIG. 3 illustrates example operations of the RAID storage system as shown in FIG. 2 for building redundancy data.

FIG. 3 illustrates example operations of the RAID storage system as shown in FIG. 2 for building redundancy data. As shown in FIG. 3, the utility module 202 may build a temporary file 304 including all invalid data areas (e.g., free data areas) and obtain a list of segments 306 of the temporary file which represent the invalid data areas. The RAID controller 206 may build redundancy data for data areas that are not on the list of segments 306 and skip the segments of the temporary file 304. After the redundancy data is built, the utility module 202 may delete the temporary file 304. As an example, the utility module 202 may reserve some of the invalid areas 302 (e.g., free data areas) for use of the operating system 210, and the temporary file does not include such reserved data areas.

For example, the utility module 202 may invoke a SetFilePointerEx system call of the operating system 210 to create the temporary file 304 to include the invalid data areas. Then the utility module 202 may obtain a file map of the temporary file 304 (e.g., by looping file retrieval pointers) in order to generate a list of the segments 306 of the temporary file. An example list of the segments 306 may appear as follows, including a heading—"FreeList," the number of the invalid data areas—"count," and the identification information of the invalid data areas—"entries: FreeEntry[ ]":

An example identification information, "FreeEntry[ ]," of an invalid data area, may appear as follows, which includes a starting address—"start_lba," and a length of the invalid data area.

In one embodiment, when the utility module 202 encounters any errors, the utility module 202 may be bypassed so that redundancy data of the source hard drive 204 can be built on the RAID array 208 according to conventional approaches under various RAID levels.

Figure 4:
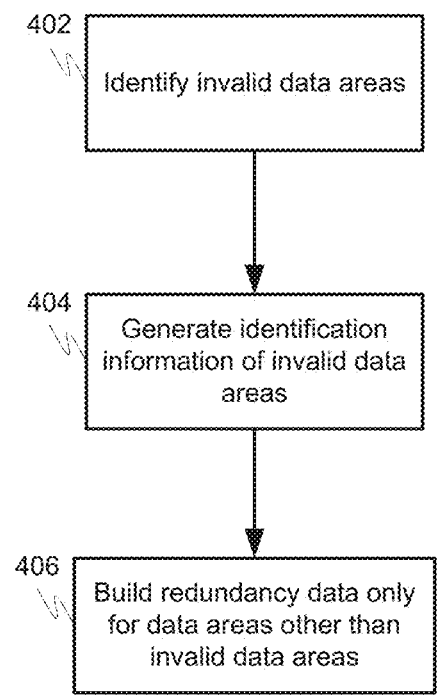
FIG. 4 illustrates an example flow chart depicting a method for building redundancy data.

FIG. 4 illustrates an example flow chart depicting a method for building redundancy data. At 402, invalid data areas on a source storage medium are identified. At 404, the identified invalid data areas on the source storage medium are mapped to certain redundancy data areas on a RAID array that includes one or more target hard drive disks. At 406, contents of valid data areas (i.e., data areas other than the identified invalid data areas) on the source storage medium are copied to some redundancy data areas on the RAID array to build redundancy data of the source storage medium.

Figure 5:
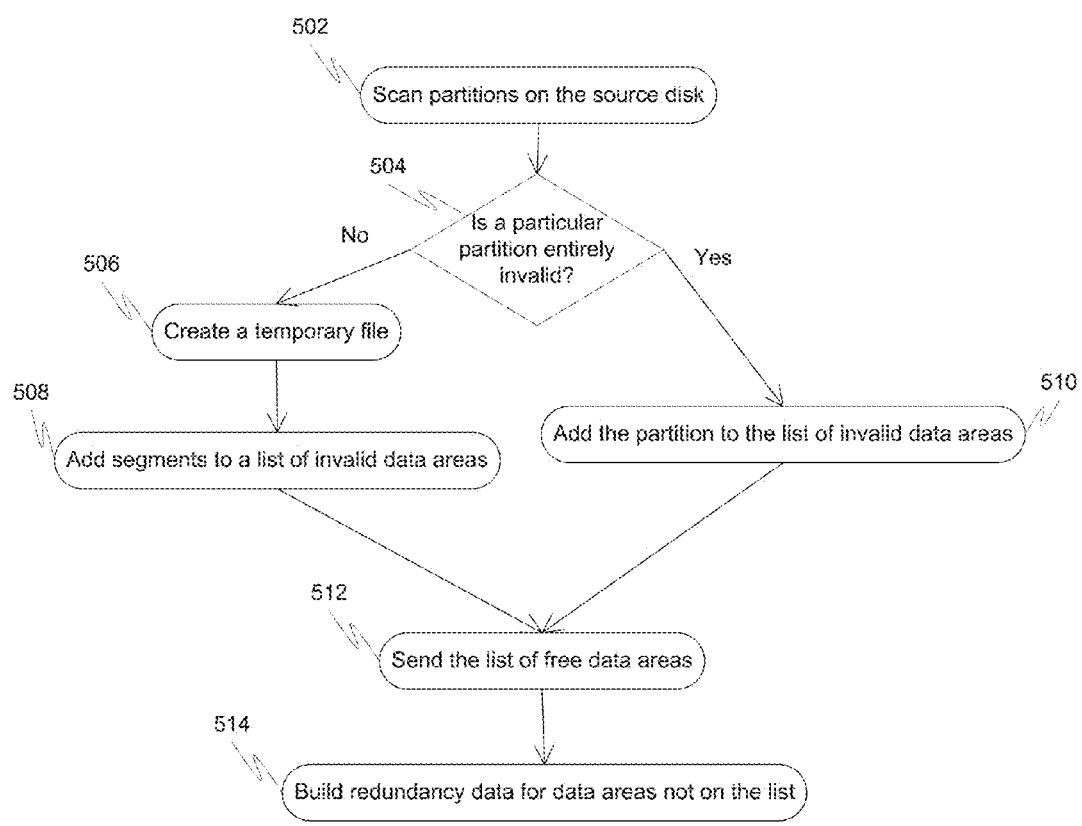
FIG. 5 illustrates another example flow chart depicting a method for building redundancy data.

FIG. 5 illustrates another example flow chart depicting a method for building redundancy data. For example, a virtual hard drive is built for a source hard drive and includes multiple partitions. At 502, multiple partitions of the virtual hard drive are scanned. At 504, a determination of whether a particular partition is entirely invalid (e.g., free) is made. If the partition is not entirely invalid, at 506, a temporary file is created to include invalid data areas in the partition. Information (e.g., address, length) associated with one or more segments of the temporary file are obtained, each segment corresponding to an invalid data area. At 508, the segments of the temporary file are added to a list of invalid data areas. On the other hand, if the partition is entirely invalid, at 510, the partition is added to the list of invalid data areas. At 512, the list of invalid areas is sent to a RAID controller for building redundancy data. At 514, redundancy data for data areas not on the list of invalid data areas are built. For example, under the RAID 1 level, contents of only the data areas not on the list of invalid data areas are written identically to two hard drives in RAID array. In another example, under the RAID 4 level or the RAID 5 level, parity information is generated only for the data areas not on the list of invalid data areas.

This written description uses examples to disclose the invention, include the best mode, and also to enable a person skilled in the art to make and use the invention. The patentable scope of the invention may include other examples that occur to those skilled in the art.

For example, the systems and methods described herein may be implemented on many different types of processing devices by program code comprising program instructions that are executable by the device processing subsystem. Other implementations may also be used, however, such as firmware or appropriately designed hardware configured to carry out the methods and systems described herein. In another example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

What is claimed is:

1. A method for building redundancy data of a source storage medium using a redundant-array-of-independent-disks (RAID) array, the RAID array including one or more target storage mediums, the source storage medium being a physical hard drive that includes physical partitions and multiple data areas, each target storage medium being a separate physical storage medium different from the source storage medium, the method comprising:
   identifying one or more invalid data areas on the source storage medium, by
      building, for the source storage medium, a virtual hard drive that includes virtual partitions corresponding to the physical partitions, and
      scanning each virtual partition to determine whether (i) no data area in the partition is invalid, (ii) only certain data areas in the partition are invalid or (iii) the entire partition comprises an invalid data area;
   generating a temporary file including a list of segments that represent the one or more invalid data areas, wherein each segment identifies an address and a length of a corresponding one of the invalid data areas;
   determining a RAID redundancy level;
   for the data areas on the source storage medium that are not identified as invalid, building redundancy data in accordance with the determined RAID redundancy level for data areas on the source storage medium and storing the redundancy data on one or more target storage mediums without building and storing redundancy data for the data areas represented in the list of segments; and
   deleting the temporary file after the redundancy data is built.

2. The method of claim 1, wherein the temporary file is generated through a system call.

3. The method of claim 1, wherein generating a temporary file comprises:
obtaining information associated with one or more segments of the temporary file, each segment corresponding to an invalid data area; and
generating the list of the segments of the temporary file.

4. The method of claim 1, wherein the invalid data areas include free data areas on the source storage medium.

5. The method of claim 4, wherein the invalid data areas do not include free data areas reserved for use of an operating system.

6. The method of claim 1, and further comprising:
when a particular partition is determined to be entirely invalid, adding the partition to a list of invalid data areas;
when the partition is determined not to be entirely invalid,
generating the temporary file including the invalid data areas in the partition;
obtaining information associated with one or more segments of the temporary file, each segment corresponding to an invalid data area; and
adding the segments to the list of invalid data areas.

7. The method of claim 3, wherein the list of the segments is generated by looping one or more file retrieval pointers of the temporary file.

8. The method of claim 1, wherein:
the source storage medium and the one or more target storage mediums correspond to different physical storage devices; and
building the redundancy data based at least in part on the RAID redundancy level for data areas on the source storage medium other than the one or more invalid data areas using the RAID array includes:
in response to the RAID redundancy level corresponding to the RAID 1 level, copying contents of the data areas on the source storage medium other than the one or more invalid data areas to the one or more target storage mediums.

9. The method of claim 1, wherein:
the source storage medium and the one or more target storage mediums correspond to different physical storage devices; and
building the redundancy data based at least in part on the RAID redundancy level for data areas on the source storage medium other than the one or more invalid data areas using the RAID array includes:
in response to the RAID redundancy level corresponding to the RAID 4 level or the RAID 5 level,
generating parity information for the data areas on the source storage medium other than the one or more invalid data areas; and
storing the parity information to the one or more target storage mediums.

10. The method of claim 1, further comprising:
determining whether an error associated with identifying the one or more invalid data areas is detected; and
in response to the error being detected, building redundancy data for all data areas on the source storage medium using the RAID array.

11. The method of claim 1, further comprising:
determining whether an error associated with generating the temporary file is detected; and
in response to the error being detected, building redundancy data for all data areas on the source storage medium using the RAID array.

12. A system for building redundancy data of a source storage medium using a redundant-array-of-independent-disks (RAID) array, the RAID array including one or more target storage mediums, the source storage medium being a physical hard drive that includes physical partitions and multiple data areas, each target storage medium being a separate physical storage medium different from the source storage medium, the system comprising:
a utility module configured to:
identify one or more invalid data areas on the source storage medium, by
building, for the source storage medium, a virtual hard drive that includes virtual partitions corresponding to the physical partitions, and
scanning each virtual partition to determine whether (i) no data area in the partition is invalid, (ii) only certain data areas in the partition are invalid or (iii) the entire partition comprises an invalid data area;
generate a temporary file including a list of segments that represent the one or more invalid data areas, wherein each segment identifies an address and a length of a corresponding one of the invalid data areas; and
determine a RAID redundancy level; and
a RAID controller configured to build, for the data areas on the source storage medium that are not identified as invalid, redundancy data in accordance with the determined RAID redundancy level for data areas on the source storage medium and store the redundancy data on one or more target storage mediums without building and storing redundancy data for the data areas represented in the list of segments;
wherein the utility module is further configured to delete the temporary file after the redundancy data is built.

13. The system of claim 12, wherein the utility module is further configured to generate the temporary file through a system call.

14. The system of claim 12, wherein the utility module is further configured to obtain information associated with one or more segments of the temporary file and generate the list of the segments of the temporary file, each segment corresponding to an invalid data area.

15. The system of claim 12, wherein the utility module is further configured to:
when a particular partition is determined to be entirely invalid, add the partition to a list of invalid data areas;
when the partition is determined not to be entirely invalid,
generate the temporary file including the invalid data areas in the partition;
obtain information associated with one or more segments of the temporary file, each segment corresponding to an invalid data area; and
add the segments to the list of invalid data areas.

16. A system for building redundancy data of a source storage medium using a redundant-array-of-independent-disks (RAID) array, the RAID array including one or more target storage mediums, the source storage medium being a physical hard drive that includes physical partitions and multiple data areas, each target storage medium being a separate physical storage medium different from the source storage medium, the system comprising:
one or more data processors;
a computer-readable memory encoded with programming instructions for commanding the one or more data processors to perform steps comprising:
identifying one or more invalid data areas on the source storage medium, by building, for the source storage medium, a virtual hard drive that includes virtual partitions corresponding to the physical partitions, and scanning each virtual partition to determine whether (i) no data area in the partition is invalid, (ii) only certain data areas in the partition are invalid or (iii) the entire partition comprises an invalid data area;

generating a temporary file including a list of segments that represent the one or more invalid data areas, wherein each segment identifies an address and a length of a corresponding one of the invalid data areas;

determining a RAID redundancy level;

for the data areas on the source storage medium that are not identified as invalid, building redundancy data in accordance with the determined RAID redundancy level for data areas on the source storage medium and storing the redundancy data on one or more target storage mediums without building and storing redundancy data for the data areas represented in the list of segments; and deleting the temporary file after the redundancy data is built.

17. The system of claim 16, wherein the temporary file is generated through a system call.

18. The system of claim 16, wherein the programming instructions encoded in the computer-readable memory that are adapted for commanding the one or more data processors to generate a temporary file are adapted for commanding the one or more data processors to perform steps comprising:

obtaining information associated with one or more segments of the temporary file, each segment corresponding to an invalid data area; and generating a list of the invalid data areas.

19. The system of claim 16, wherein the programming instructions encoded in the computer-readable memory are adapted for commanding the one or more data processors to perform further steps comprising:

when a particular partition is determined to be entirely invalid, adding the partition to a list of invalid data areas;

when the partition is determined not to be entirely invalid, generating the temporary file including the invalid data areas in the partition;

obtaining information associated with one or more segments of the temporary file, each segment corresponding to an invalid data area; and adding the segments to the list of invalid data areas.

* * * * *